3,324,076
ALKENYL AROMATIC POLYMERS CONTAINING HALOGEN COMPOUNDS AS FLAME RETARDANTS AND TRI(2-PROPYNYL)PHOSPHATE OR TRI(2-PROPYNYL)BORATE AS CORROSION INHIBITOR
Max E. Elder and Richard T. Dickerson, Midland, Mich., and William F. Tousignant, Wauwatosa, Wis., assignors to The Dow Chemical Company, Midland, Mich., a corporation of Delaware
No Drawing. Filed Nov. 4, 1963, Ser. No. 321,291
5 Claims. (Cl. 260—45.8)

This invention relates to resin compositions containing a halogenated compound as a self-extinguishing agent. More particularly, it concerns the inhibition of corrosion of molding equipment owing to the thermal decomposition of the self-extinguishing agent when these resins are molded at elevated temperatures.

Resins of alkenyl aromatic compounds are finding widespread use in the manufacture of building materials, lighting fixtures, household appliances and the like as a result of their aesthetic characteristics and ease of fabrication. Many of the resins used in manufacturing these items contain a minor amount of a flameproofing agent which renders the resin self-extinguishing to reduce the potential fire hazard. These agents frequently are halogenated compounds and particularly brominated compounds which decompose at the flame temperature of the resin, releasing hydrogen halide and extinguishing the flame. The thermal decomposition temperatures of some of these agents are considerably lower than the flame temperature of the resin; therefore, hydrogen halide sometimes is released during the molding or manufacture of the resin articles at elevated temperature. This free hydrogen halide corrodes the equipment used in molding or processing the resin thereby necessitating frequent repair or replacement.

We have found that certain compounds used in combination with the flameproofing agents inhibit the corrosion of metal parts exposed to the resin at high temperature. According to our invention mold corrosion is substantially inhibited by intimately mixing from about 0.1 to about 2.0 weight percent of either tri(2-propynyl)phosphate or tri(2-propynyl)borate in the resin.

These corrosion inhibitors may be used in combination with flameproofing agents such as pentabromomonochlorocyclohexane, tetrabromobutane, styrene dibromide, bis(2,3,3-tribromoallyl)maleate, 2,2-bis-[3,5-dibromo-4-(2,3,3-tribromoalloxy)phenyl]propane, dibromodichloroethane, tetrabromoethylene, tris(2,3-dibromopropyl)phosphate and acetylene tetrabromide as well as the corresponding chorinated compounds having self-extinguishing properties. These flame retardant agents may be stabilized with materials such as sodium tripolyphosphate and triphenyl phosphate. Additionally, the resin may contain an organic peroxide such as tert.-butyl peracetate, cumene hydroperoxide, cumyl isopropyl peroxide, etc. as a synergist for the halogenated compound.

Polymers which may be rendered self-extinguishing and non-corrosive according to this invention are the homopolymers and copolymers of alkenyl aromatic compounds such as styrene, vinyl toluene, vinyl xylene, ethyl styrene, chlorostyrene and ethylvinylbenzene as well as copolymers of two or more of these compounds or one or more of these compounds together with an aliphatic vinyl monomer such as acrylonitrile, methyl methacrylate, vinyl acetate and the like. The invention is also applicable to the high impact styrene polymers which contain a minor amount, for example 1–10 parts per 100 parts resin of a rubbery polymer such as polybutadiene or polyisoprene.

The ability of these compounds to inhibit the corrosion of steel in contact with resins containing halogenated flameproofing agents was demonstrated by molding small quantities of the resin mixture against highly polished steel plates, then examining them for the presence of corrosion pits or discoloration.

Polystyrene containing 1 percent pentabromomonochlorocyclohexane, a highly corrosive self-extinguishing agent, one percent triphenylphosphate as a stabilizer, 0.5 percent 2(2'-hydroxy, 5'-methylphenyl)-benzotriazole as a light stabilizer and one percent corrosion inhibitor was dissolved in methylene chloride then the solvent evaporated. After the sample was dried in a vacuum oven at 50° C. it was ground, re-dried in the oven then molded under pressure against the polished steel plate for 15 minutes at 200° C. The plate was cooled then removed from the mold and placed in a room at constant temperature and humidity for 24 hours. Thereafter the plate was observed for the presence of corrosion. The plates used with polystyrene containing either tri(2-propynyl)phosphate or tri(2-propynyl)borate as corrosion inhibitors were bright and shiny with no pitting, whereas a plate used with polystyrene containing one percent of the halogenated compound without either of these corrosion inhibitors was severely corroded.

Styrene dibromide is another corrosive flameproofing agent. Polystyrene samples containing 0.5 percent of this agent and one percent tri(2-propynyl)phosphate as a corrosion inhibitor were molded against steel plates for 15 minutes at 200° C. The plate was then cooled and placed in a room at constant temperature and humidity for 24 hours. At the end of that time the plate was still shiny with only slight pitting, whereas a plate having polystyrene containing 0.5 percent of this flameproofing agent and no corrosion inhibitor molded against it was severely pitted and completely covered with a thick layer of corrosion products.

Another test designed for more stable, less corrosive self-extinguishing agents utilized an injection molding machine. Polystyrene containing the potentially corrosive agents was injected repeatedly into the cavity of a highly polished mold for two hours at 210° F. then the mold examined for corrosion. The test samples of resin were prepared by mixing suspension polymerized polystyrene with 0.15 percent 2,2-bis[3,5-dibromo-4-(2,3,3-tribromoalloxy)phenyl]-propane, one percent triphenyl phosphate and 0.5 percent 2(2'-hydroxy, 5'-methylphenyl)benzotriazole. The corrosion inhibitor was added by dissolving it in methanol then pouring the solution on the beads and evaporating the solvent. The bead size of the polymer was about 50 mesh screen size. The mold was removed from the molding machine after the test and held in a room at constant temperature and humidity for 24 hours before it was checked for corrosion. The surface of the mold exposed to polystyrene containing one percent tri(2-propynyl)phosphate was very shiny at the conclusion of the test with one small area showing some evidence of corrosion. The mold exposed to polystyrene containing the same flameproofing agent but no corrosion inhibitor had discolored streaks and larger areas of corrosion than the inhibited sample.

These corrosion inhibitors may be added to resins in concentrations from about 0.1 percent to about 2.0 percent by weight and preferably between 0.5 and 1.0 percent. In addition to the method of mixing the inhibitor with the resin wherein both are dissolved in a solvent, the mixing may be accomplished by dry blending then feeding the mixture to the extruder where it is melted and mixed intimately in that form.

We claim:
1. A flame retardant thermoplastic molding resin char- acterized by a low corrosivity comprising an alkenyl aromatic polymer containing a minor amount of a halogenated compound selected from the group consising of pentabromomonochlorocyclohexane, tetrabromobutane, styrene dibromide, bis(2,3,3-tribromoallyl)maleate, 2,2-bis[3,5 - dibromo - 4 - (2,3,3-tribromoalloxy)phenyl]propane, dibromodichloroethane, tetrabromoethylene, tris (2,3-dibromopropyl) phosphate and acetylene tetrabromide as a flame retardant and from about 0.1 to about 2.0 percent of a corrosion inhibitor selected from the group consisting of tri(2-propynyl)phosphate and tri (2-propynyl)borate.

2. A flame retardant thermoplastic molding resin according to claim 1 wherein said alkenyl aromatic polymer is polystyrene.

3. A flame retardant thermoplastic molding resin according to claim 1 containing from 0.5 to 1.0 percent of tri(2-propynyl)phosphate as the corrosion inhibitor.

4. A flame retardant thermoplastic molding resin according to claim 1 containing from 0.5 to 1.0 percent of tri(2-propynyl)borate as the corrosion inhibitor.

5. A flame retardant thermoplastic molding resin characterized by a low corrosivity comprising polystyrene containing about 1 percent pentabromomonochlorocyclohexane, 1 percent triphenyl phosphate, 0.5 percent 2(2'-hydroxy, 5'-methylphenyl)benzotriazole and 1 percent of a corrosion inhibitor selected from the group consisting of tri(2-propynyl)phosphate and tri(2-propynyl)borate.

References Cited

UNITED STATES PATENTS 3,061,584   10/1962   Raley _____ 260—45.8

LEON J. BERCOVITZ, *Primary Examiner.*

DONALD CZAJA, *Examiner.*

M. J. WELSH, *Assistant Examiner.*